US011968507B2

(12) United States Patent
Cheng et al.

(10) Patent No.: US 11,968,507 B2
(45) Date of Patent: Apr. 23, 2024

(54) SPEAKER HAVING FIRST DIAPHRAGM, SECOND DIAPHRAGM WITH DIFFERENT STIFFNESS FROM FIRST DIAPHRAGM, AND DRIVER LOCATED IN THROUGH HOLE OF FIRST DIAPHRAGM

(71) Applicant: AAC Kaitai Technologies (Wuhan) CO., LTD, Hubei (CN)

(72) Inventors: Shiyang Cheng, Shenzhen (CN); Qiang Dan, Shenzhen (CN); Yiwei Zhou, Shenzhen (CN); Yu Shen, Shenzhen (CN); Yang Li, Shenzhen (CN)

(73) Assignee: AAC Kaital Technologies (Wuhan) CO., LTD, Wuhan (CN)

( * ) Notice: Subject to any disclaimer, the term of this patent is extended or adjusted under 35 U.S.C. 154(b) by 0 days.

(21) Appl. No.: 17/566,632

(22) Filed: Dec. 30, 2021

(65) Prior Publication Data

US 2023/0094844 A1 Mar. 30, 2023

(30) Foreign Application Priority Data

Sep. 28, 2021 (CN) .......................... 202111145144.2

(51) Int. Cl.
*H04R 7/10* (2006.01)
*H04R 17/00* (2006.01)

(52) U.S. Cl.
CPC ............... *H04R 7/10* (2013.01); *H04R 17/00* (2013.01)

(58) Field of Classification Search
CPC .................................. H04R 7/10; H04R 17/00
See application file for complete search history.

(56) References Cited

U.S. PATENT DOCUMENTS

| | | | | |
|---|---|---|---|---|
| 6,218,766 B1 * | 4/2001 | Warnaka | B06B 1/0603 | 310/322 |
| 2004/0081326 A1 * | 4/2004 | Michiels | H04R 17/00 | 381/190 |
| 2010/0219722 A1 * | 9/2010 | Onishi | H04R 17/00 | 310/348 |
| 2013/0043766 A1 * | 2/2013 | Takahashi | H04R 17/00 | 310/326 |
| 2021/0266672 A1 * | 8/2021 | Wang | B32B 27/285 | |

* cited by examiner

*Primary Examiner* — Mark Fischer
(74) *Attorney, Agent, or Firm* — W&G Law Group

(57) ABSTRACT

One of the main objects of the present invention is to provide a speaker with optimized overall acoustic performance. To achieve the above-mentioned object, the present invention provides a speaker including: a base with an accommodation cavity; a vibration sounding assembly accommodated in the accommodation cavity, including a first diaphragm and a second diaphragm, and a driver fixed to the first diaphragm for driving the first diaphragm and the second diaphragm to vibrate and produce sound. The second diaphragm stacks on the first diaphragm, and a stiffness of the second diaphragm is different from a stiffness of the first diaphragm.

6 Claims, 3 Drawing Sheets

SPEAKER HAVING FIRST DIAPHRAGM, SECOND DIAPHRAGM WITH DIFFERENT STIFFNESS FROM FIRST DIAPHRAGM, AND DRIVER LOCATED IN THROUGH HOLE OF FIRST DIAPHRAGM

FIELD OF THE PRESENT DISCLOSURE

The present invention relates to electromechanical transducers, and more particularly to a speaker.

DESCRIPTION OF RELATED ART

Speakers are widely used in personal terminals and smart electronic devices. It is mainly used to convert electrical signals into sound signals. Traditional speakers usually adopt a moving coil structure. Although it has excellent low-frequency performance, there are obvious shortcomings in high-frequency hearing. At the same time, the production efficiency of the assembly structure adopted by the traditional speaker is obviously restricted, which increases the production cost accordingly.

In response to the above problems, players in the market are trying to develop a micro-speaker based on MEMS (micro-electro-mechanical system). The miniature speaker is mainly based on the piezoelectric drive mode, and the use of MEMS technology can effectively improve efficiency and rapidly expand production capacity. At the same time, good high frequency performance can be obtained by controlling the piezoelectric driver mode.

However, as far as the existing MEMS speaker structure is concerned, the decoupling of the driving structure and the displacement structure has not been achieved. Therefore, the drive structure needs to assume the functions of providing power and displacement at the same time. There will be mutual restriction between the two, and the vibration displacement of the speaker is still greatly restricted. Therefore, the overall performance of the speaker cannot be further optimized.

Therefore, it is necessary to provide a brand-new speaker to solve the above technical problems.

SUMMARY OF THE PRESENT DISCLOSURE

One of the main objects of the present invention is to provide a speaker with optimized overall acoustic performance.

To achieve the above-mentioned objects, the present invention provides a speaker including: a base with an accommodation cavity; a vibration sounding assembly accommodated in the accommodation cavity, including a first diaphragm and a second diaphragm, and a driver fixed to the first diaphragm for driving the first diaphragm and the second diaphragm to vibrate and produce sound. The second diaphragm stacks on the first diaphragm, and a stiffness of the second diaphragm is different from a stiffness of the first diaphragm.

In addition, the first diaphragm includes a through hole along a thickness direction thereof, and the driver penetrates the through hole.

In addition, the driver is fixed on an upper surface or a lower surface of the first diaphragm.

In addition, the second diaphragm and the driver are arranged on a same side of the first diaphragm.

In addition, the second diaphragm and the driver are arranged on different sides of the first diaphragm.

In addition, the second diaphragm includes a multilayer sub-diaphragm stacked on a same side of the first diaphragm; or the multilayer sub-diaphragm is stacked on different sides of the first diaphragm.

In addition, the stiffness of the first diaphragm is less than a stiffness of the driver.

In addition, a stiffness of the driver is symmetrically distributed along a central axis thereof.

In addition, a rigidity of the driver is evenly distributed.

In addition, the driver is fixed to the first diaphragm by gluing.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

Figure 1:
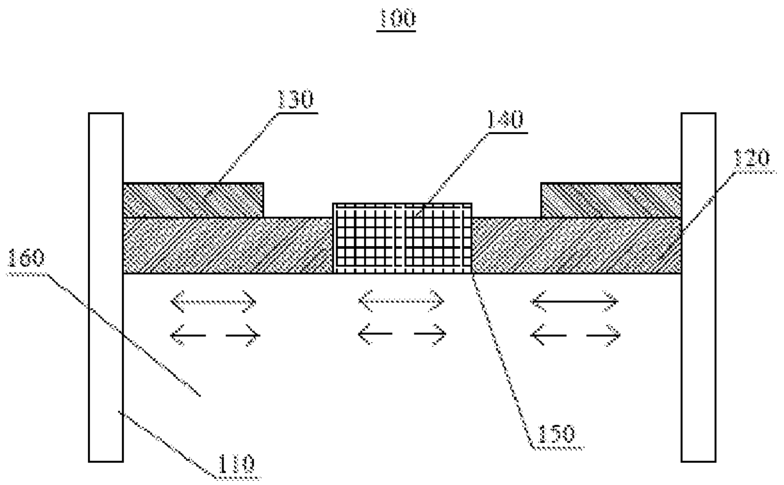
FIG. 1 is a cross-sectional view of a speaker in accordance with an embodiment of the present invention.

The present disclosure will hereinafter be described in detail with reference to several exemplary embodiments. To make the technical problems to be solved, technical solutions and beneficial effects of the present disclosure more apparent, the present disclosure is described in further detail together with the figures and the embodiments. It should be understood the specific embodiments described hereby are only to explain the disclosure, not intended to limit the disclosure.

As shown in FIGS. 1-5, the present invention provides a speaker 100, which includes a base 110 having a accommodation cavity 150 and a vibration sounding assembly accommodated in the accommodation cavity 150. The vibration sounding assembly includes a first diaphragm 120 and a second diaphragm 130 fixed to the base 110, and a driver 140 fixed to the first diaphragm 120 to drive the first diaphragm 120 and the second diaphragm 130 to vibrate and produce sound. Wherein, the second diaphragm 130 is stacked on the first diaphragm 120. Also, the stiffness of the second diaphragm 130 and the first diaphragm 120 are different. The projections of the second diaphragm 130 and the driver 140 on the first diaphragm 120 do not overlap.

Figure 2:
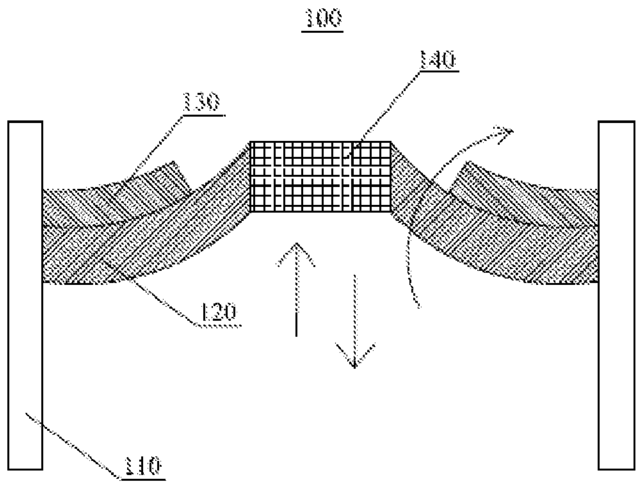
FIG. 2 is a schematic view of an out-of-plane movement of the speaker.

Please refer to FIG. 1 and FIG. 2. Based on the above architecture, if a dynamic input with audio signal is applied to the driver 140, the driver 140 will receive the above audio drive signal to generate in-plane stress and strain (Please refer to FIG. 1 and FIG. 2, the horizontal arrow direction). The stress and strain are transmitted to the first diaphragm 120, and the first diaphragm 120 itself generates an in-plane expansion and contraction effect by receiving the stress and strain transmitted by the driver 140. And transfer the in-plane expansion and contraction to the second diaphragm 130. At the same time, the second diaphragm 130 superimposed on the first diaphragm 120 has an inhibitory effect on the in-plane expansion and contraction of the first diaphragm 120, that is, the second diaphragm 130 restricts the in-plane expansion and contraction of the first diaphragm 120. In addition, due to the mismatch of the stiffness of the second diaphragm 130 and the stiffness of the first diaphragm 120, the second diaphragm 130 and the first diaphragm 120 will warp out-of-plane together (please refer to the direction of the arrow bent upward in FIG. 2). Driven by the out-of-plane warping displacement, the driver 140 also vibrates up and down out-of-plane together. That is, the entire structure reciprocates out-of-plane vibration and restores the audio signal. In other words, the first diaphragm in this example is equivalent to a transmission structure, which completely decouples force and displacement. The driver is only responsible for generating in-plane stress and does not warp itself, which is equivalent to a driving structure. The first diaphragm and second diaphragm form a composite warped layer, which is equivalent to a displacement structure.

It should be noted that this example does not specifically limit the structure of base. For example, it has a ring structure, and in some embodiments, it can have a circular ring structure. Of course, in some other embodiments, it can also be a triangular ring structure or other polygonal ring structure.

Specifically, as shown in FIGS. 1-5, the base 110 includes a side wall that encloses a accommodation cavity 150. The first diaphragm 120 and the second diaphragm 130 are fixed on the side wall. That is to say, the base 110 surrounds the periphery of the vibrating and sounding assembly, and plays a fixed support role for the first diaphragm 120 and the second diaphragm 130.

It should be further noted that this embodiment does not specifically limit the specific structure between the driver, the first diaphragm and the second diaphragm in the vibration and sound component. As long as the force and displacement can be decoupled through the first diaphragm.

Specifically, in some embodiments, as shown in FIG. 1, the first diaphragm 120 is provided with a through hole 160 along its thickness direction. The driver 140 is installed in the through hole 160, and the second diaphragm 130 is stacked on the upper surface of the first diaphragm 120. In other words, the first diaphragm in this example extends from the edge of the driver to the sidewall of the base.

It should be understood that in other embodiments, the first diaphragm is provided with a through hole along its thickness. The driver is installed in the through hole. The second diaphragm can also be stacked on the lower surface of the first diaphragm, which is not specifically limited.

Figure 3:
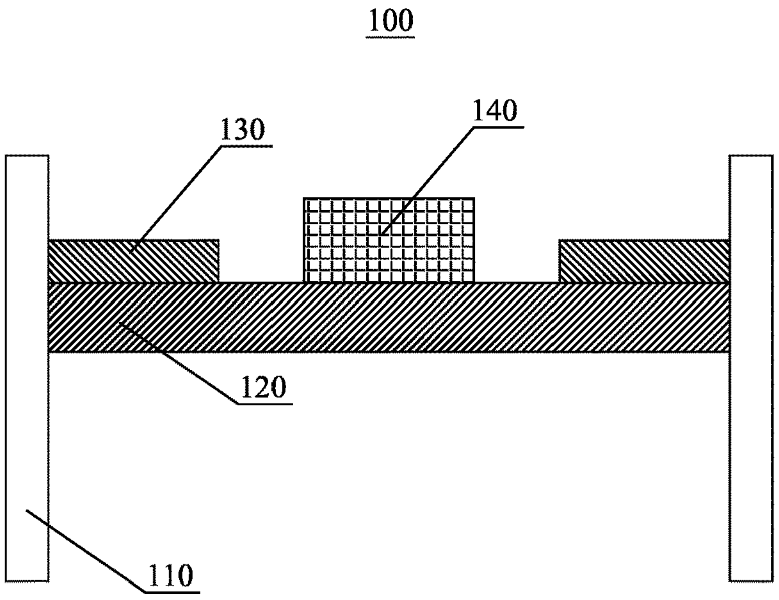
FIG. 3 is a cross-sectional view of a speaker in accordance with another embodiment of the present invention.
Figure 4:
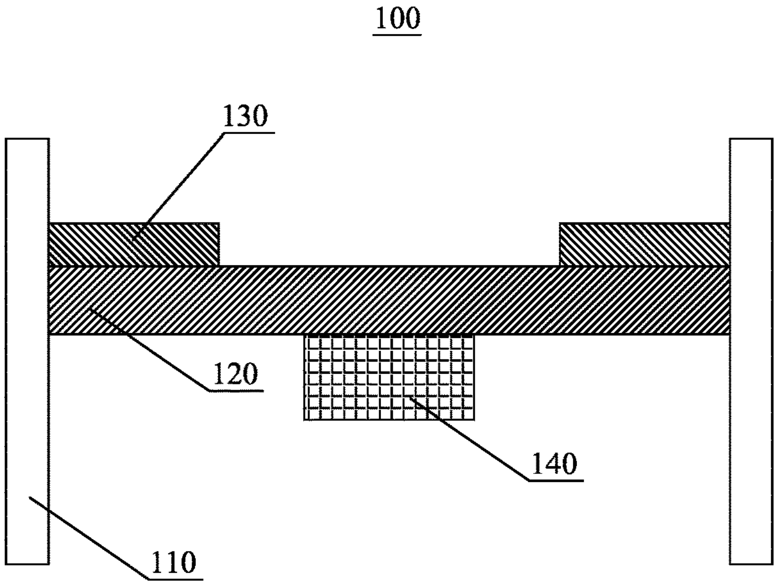
FIG. 4 is a cross-sectional view of a speaker in accordance with another embodiment of the present invention.

Furthermore, in other embodiments, as shown in FIGS. 3-4, the driver 140 can also be fixed to the upper or lower surface of the first diaphragm 120 by gluing, that is, the driver 140 can span the first diaphragm 120.

Since the driver in this example is fixed on the surface of the first diaphragm, the second diaphragm and driver can be set on the same side of the first diaphragm. Of course, the above-mentioned second diaphragm and driver can also be set on different sides of the first diaphragm.

Specifically, referring to FIG. 3, in some embodiments, the driver 140 is fixed on the upper surface of the first diaphragm 120, and the second diaphragm 130 is also stacked on the upper surface of the first diaphragm 120.

Specifically, referring to FIG. 4, in other embodiments, the driver 140 is fixed on the lower surface of the first diaphragm 120, and the second diaphragm 130 is stacked on the upper surface of the first diaphragm 120.

It should be understood that, in other embodiments, the positional relationship of the various structures in the driving sound assembly can also be modified as follows. For example, the driver is fixed on the upper surface of the first diaphragm, and the second diaphragm is stacked on the lower surface of the first diaphragm. For another example, the driver is fixed on the bottom surface of the first diaphragm, and the second diaphragm is stacked on the bottom surface of the first diaphragm.

It should be noted that the second diaphragm in this example can be a one-layer structure or a multi-layer material stacked structure. For example, the second diaphragm includes multiple sub-diaphragms, which are stacked on the same side of the first diaphragm. Or, multilayer sub-diaphragms are stacked on different sides of the first diaphragm.

Figure 5:
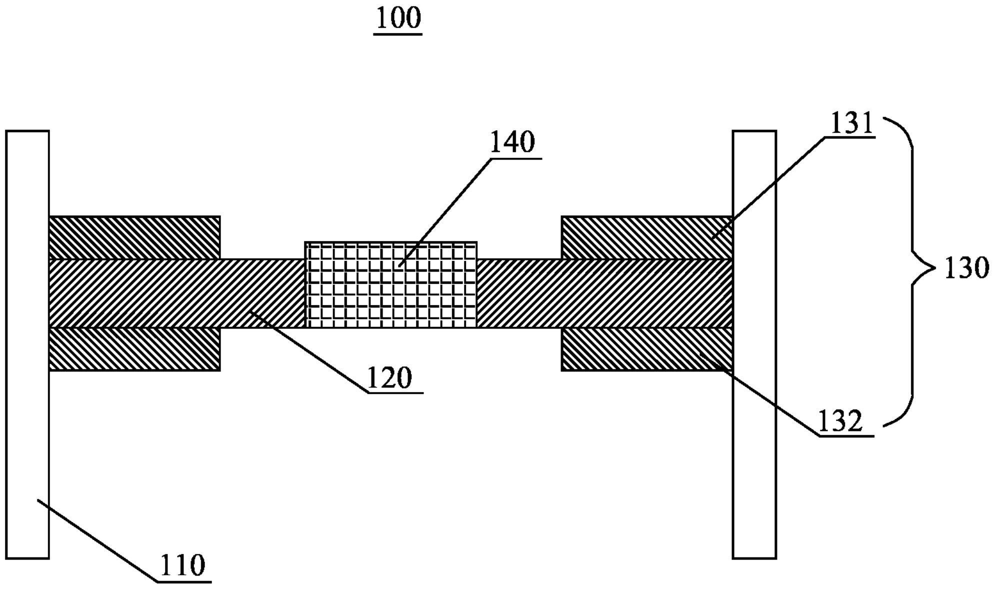
FIG. 5 is a cross-sectional view of a speaker in accordance with another embodiment of the present invention.

Specifically, as shown in FIG. 5, the second diaphragm 130 includes a first layer of sub-diaphragm 131 and a second layer of sub-diaphragm 132. Wherein, the first layer of sub-diaphragm 131 is stacked on the upper surface of the first diaphragm 120. The second layer of sub-diaphragm 132 is stacked on the lower surface of the first diaphragm 120. Of course, in other embodiments, the above two sub-diaphragms can also be stacked on the upper surface of the first diaphragm. Alternatively, the above two sub-diaphragms can also be stacked on the lower surface of the first diaphragm.

It should be further noted that the first diaphragm in this example can also be a single-layer structure. It may also have a multi-layer structure, which is not specifically limited.

It still needs to be explained that the main function of the first diaphragm is to transmit the stress and strain provided by the driver. Therefore, the overall stiffness of the first diaphragm should not be too large. If the stiffness is too large, the transmission of stress and strain may be hindered.

Specifically, in some preferred embodiments, the overall stiffness of the first diaphragm is at least less than the overall stiffness of the driver.

It should be noted that based on the premise that the stiffness of the first diaphragm and the stiffness of the second diaphragm are different, the first diaphragm and the second diaphragm can be arbitrarily selected to match the stiffness of the material. Under the same driving force, the scheme of maximum warpage displacement can be optimized to maximize speaker performance gains.

Furthermore, the stiffness of the driver in this example should also be reasonably configured. It should be understood that the overall rigidity of the driver cannot be too large to prevent sufficient out-of-plane displacement. Of course, the overall rigidity of the driver should not be too small to prevent arching warping itself.

Specifically, in some embodiments, the stiffness of the driver is evenly distributed. Or, in other embodiments, the stiffness of the driver is symmetrically distributed along its central axis. This can prevent its own warpage due to uneven internal rigidity while it provides driving force.

It should be noted that the driver in this example is a single block, but in fact it should be regarded as a "black box". That is, a functional body containing multiple layers of complex structures such as electrodes and functional layers can contain multiple layers, multiple materials, and even complex spatial structures. But the whole is a structural module with the function of generating in-plane stress and transmitting to the first diaphragm.

Specifically, the driver may be a piezoelectric transducer, which includes a piezoelectric layer and metal electrodes attached to opposite sides of the piezoelectric layer. Of course, the driver can also be an electrostatic transducer or an electromagnetic transducer, which is not specifically limited.

Compared with the prior art, in the speaker of the present invention, the vibration generating component includes two diaphragms. Wherein, the first diaphragm is equivalent to a transmission structure, and the first diaphragm is fixed with a driver and a second diaphragm. By accepting the in-plane stress generated by the driver, it produces an in-plane expansion and contraction effect. Based on the difference in stiffness between the first diaphragm and the second diaphragm, the second diaphragm constrains the in-plane expansion and contraction of the first diaphragm to produce out-of-plane warpage, which drives the entire system to vibrate out-of-plane. The speaker overall structure of the present invention realizes the deep decoupling of the driving structure and the displacement structure. The driver is only responsible for generating in-plane stress and does not cause out-of-plane warping. In this way, the vibration of the speaker is greatly free from the influence of the driver's own performance, and it is easy to obtain high-level sound pressure output in the full frequency range. In addition, the first diaphragm and second diaphragm in the speaker of the present invention can be arbitrarily selected with stiffness matching materials. Under the same driving force, the maximum warpage displacement scheme can be optimized to maximize the speaker performance gains.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A speaker comprising:

a base with an accommodation cavity;

a vibration sounding assembly accommodated in the accommodation cavity, comprising a first diaphragm and a second diaphragm, and a driver fixed to the first diaphragm for driving the first diaphragm and the second diaphragm to vibrate and produce sound; wherein the second diaphragm stacks on the first diaphragm, and a stiffness of the second diaphragm is different from a stiffness of the first diaphragm, the first diaphragm is close to the accommodation cavity, the first diaphragm includes a through hole along a thickness direction thereof, the driver spaced apart from the second diaphragm penetrates the through hole, and the through hole is communicating with the accommodation cavity, a projection of the second diaphragm and the driver on the first diaphragm do not overlap.

2. The speaker as described in claim 1, wherein, the second diaphragm includes a multilayer sub-diaphragm stacked on a same side of the first diaphragm; or the multilayer sub-diaphragm is stacked on different sides of the first diaphragm.

3. The speaker as described in claim 1, wherein, the stiffness of the first diaphragm is less than a stiffness of the driver.

4. The speaker as described in claim 1, wherein, a stiffness of the driver is symmetrically distributed along a central axis thereof.

5. The speaker as described in claim 1, wherein, a rigidity of the driver is evenly distributed.

6. The speaker as described in claim 1, wherein, the driver is fixed to the first diaphragm by gluing.

* * * * *